Figure 1:
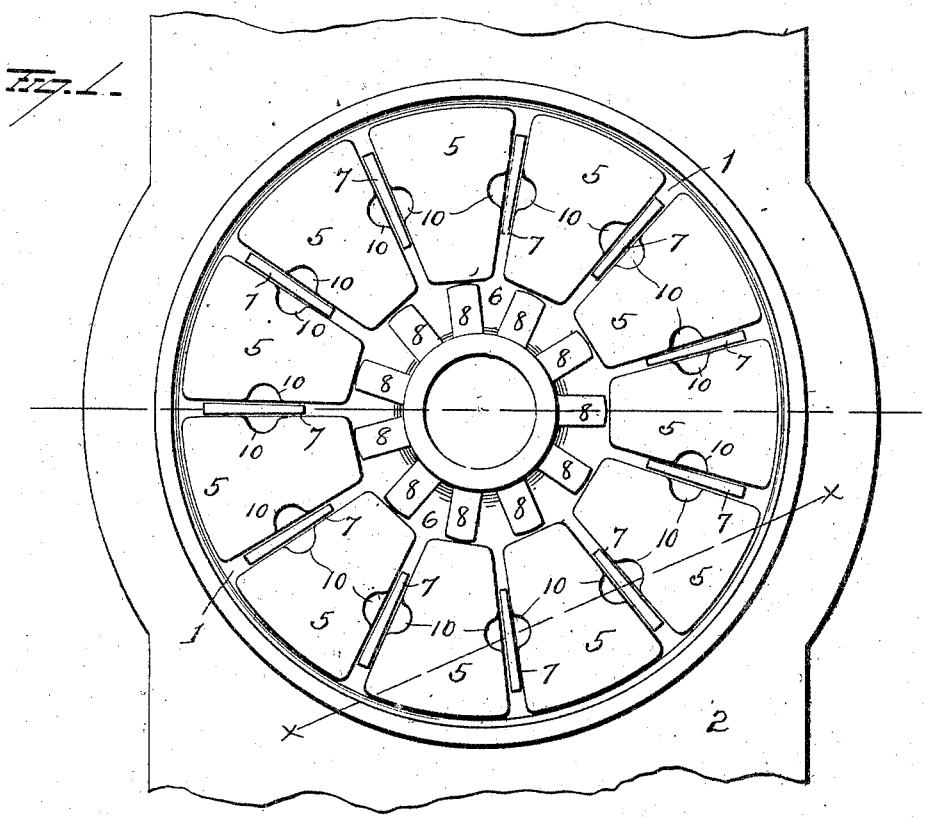

S. P. BUSH.
CENTER BEARING.
APPLICATION FILED DEC. 2, 1907.

967,721.

Patented Aug. 16, 1910.
2 SHEETS—SHEET 1.

WITNESSES
E. L. Nottingham
G. F. Downing.

INVENTOR
S. P. Bush
By H. A. Seymour
Attorney

S. P. BUSH.
CENTER BEARING.
APPLICATION FILED DEC. 2, 1907.
967,721.
Patented Aug. 16, 1910.
2 SHEETS—SHEET 2.
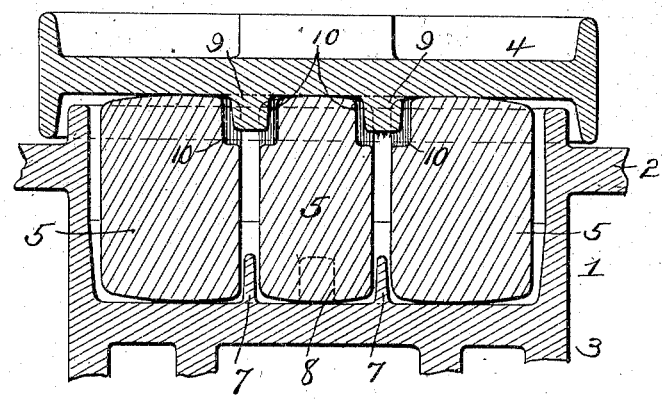
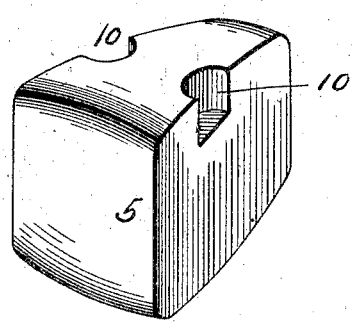
WITNESSES
E. Nottingham
G. F. Downing
INVENTOR
S. P. Bush
By H. A. Seymour
Attorney

UNITED STATES PATENT OFFICE.

SAMUEL P. BUSH, OF COLUMBUS, OHIO.

CENTER-BEARING.

967,721.

Specification of Letters Patent.   Patented Aug. 16, 1910.

Application filed December 2, 1907. Serial No. 404,816.

*To all whom it may concern:*

Be it known that I, SAMUEL P. BUSH, of Columbus, in the county of Franklin and State of Ohio, have invented certain new and useful Improvements in Center-Bearings; and I do hereby declare the following to be a full, clear, and exact description of the invention, such as will enable others skilled in the art to which it appertains to make and use the same.

My invention relates to the center bearing of devices that require a rotative movement, but which has its widest application to railway cars, and relates also to those members which cover the bearings.

It has reference especially to that type of bearing known as anti-friction bearing.

It is well known that the modern high capacity car, when mounted on trucks having the ordinary bearings, will develop much resistance to the pivoting of the trucks in passing around a curve, and this adds greatly to the pressure of the wheel flange against the outer rail, making it difficult for the flange and the rail to withstand pressure and wear, and also greatly increasing the resistance of cars to movement. To relieve this pressure or resistance to pivoting is most desired. Anti-friction bearings have been designed, consisting of a series of balls, or a series of conical rollers mounted on suitable plates with bearing surfaces, but they have either been inadequate to withstand heavy pressures or have been very expensive, requiring special and expensive materials, rendering them more or less impracticable. Furthermore, many of them have not been so designed as to provide for some of the conditions which necessarily prevail in ordinary railway practice, such as the lateral rocking of the car on its center bearings. Besides this it is well known that a roller or ball, like a wheel of small diameter, offers more resistance to rolling motion between surfaces, than does one of large diameter. Most bearings have heretofore been made up of balls or rollers of comparatively small diameter which, under the heavy loads now usual in railway practice, are either distorted themselves, or distort and make considerable indentations upon the surfaces between which they roll.

In my invention I aim to overcome these difficulties by using rockers of larger diameter, and increasing the number so as to increase the number of contacting surfaces, and thus reduce the pressure that each rocker and its corresponding contacting surface will have to bear, thus enabling me to use the more ordinary materials and make the device more practicable in both service and cost.

Figure 2:
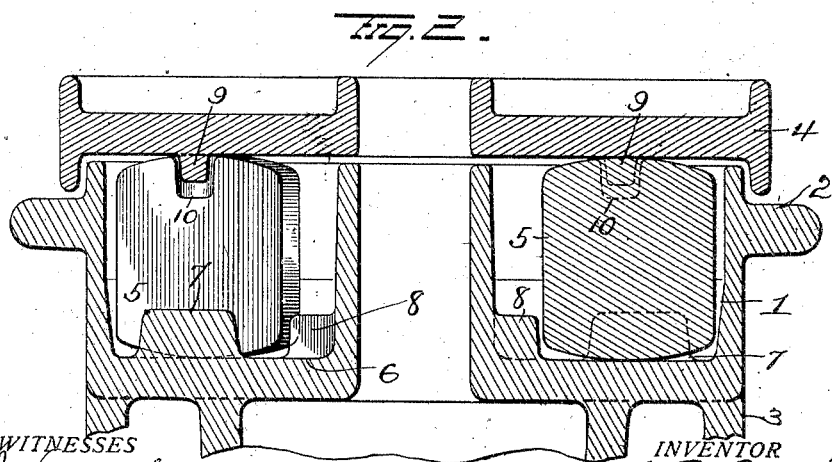

In the accompanying drawings, Figure 1 is a plan view of a truck bolster showing my improvement thereon. Fig. 2 a view in vertical section of the same and showing the upper bearing member. Fig. 3 is a sectional view on the line $x$—$x$ of Fig. 1 and showing the upper bearing member. Fig. 4 is a view of the roller or rocker detached.

In my device I use preferably a truck bolster or supporting member having a depressed center bearing member 1 the depression being as much as may be desirable below the top surface of the compression member 2 of the bolster or supporting body 3. I might, in some cases, prefer to reverse this construction and make the depression in an upper bearing member 4, but the former would be more generally used. The center bearing member 1, may be integral with the bolster, as if cast in one piece with it, or it might be a separate plate or member mounted therein. The upper bearing member 4 would, in the case of railway cars, be attached to the car body.

Between the upper and lower bearing members or plates, rockers, 5, are mounted. These rockers are of wedge shape in horizontal section, their upper and lower surfaces being preferably partly spherical in shape. The object in making the rockers segmental is that in the case of a car center bearing, as well as other rotative bearings, the rotation takes place through but a small fraction of a complete rotation, and therefore the rockers are not required to make a complete revolution, but on the contrary a small portion of a revolution. Heretofore the rollers or balls employed have been complete and will permit a complete rotation. This, however, is unnecessary in view of the conditions of service, and operates as a great disadvantage in permitting of the use of a very limited number of rollers which must necessarily be smaller in diameter than in my construction; adding considerably to the resistance of rotation; reducing the number of contacting points or surfaces, and requiring rollers or balls so small that they will either distort the bearing surfaces or themselves become badly worn. By making my rockers 5 segmental, I am able to place them very close together as will be seen in Fig. 1, which enables me to use more ordinary and cheaper materials in a completely satisfactory manner.

In order to prevent displacement of the rockers 5, I have provided the floor 6 of center bearing member 1 with ribs 7 preferably triangular in cross section, which while permitting of free rocking motion of the rockers, prevent any displacement laterally, and the rockers or rollers are prevented from moving inwardly toward the center pin or king bolt by the lugs 8 preferably formed integral with the floor of the recessed bearing.

In turning a curve, the truck first turns, after which the car body swings to one side, thus throwing all the weight of the car onto the rockers at one side of the center and taking all weight off the others. This will cause a radial rocking of the rockers. Unless means were provided for preventing the return of those rollers freed from the weight of the car, they would rock back to their normal positions, and when again engaged by the car, as would be the case when the truck reaches the straight track, they would not stand upright, but be slightly inclined. To prevent this, I provide the upper member 4 with depending lugs 9 which engage recesses 10 in the sides of the segments, so that when the truck is turned the segments are engaged by the depending lugs 9 and are all tilted sidewise in unison, and when the weight of the car is shifted to one side, those segments free of the weight, are prevented from returning to their normal position by the depending lugs 9.

The rockers 5 may have their bearing surfaces of true conical form, or the bearing surfaces may be curved in different ways, but I prefer to have these surfaces of spherical form, as in rotating the least amount of resistance will be offered and at the same time permit of limited rotation in any direction, as, in addition to the rotative motion there should be lateral or longitudinal motion which is often the case.

The surfaces between which the rollers operate may be either plain or curved. I prefer to make them plain as shown in Fig. 2.

In making the bearing surfaces of the rockers, it is desirable to so form them that as they rock or roll from their normal and central position they would, if free to move, return to that position by reason of the curvature of the surfaces, the object being that if operating under a railroad car, and the car has passed around a curve, the center bearing will exert a tendency to turn the truck to its normal and straight position again and so hold it. This may be accomplished by having the radii of the bearing surfaces increase as the roller moves away from its normal position.

It is evident that many slight changes might be resorted to in the relative arrangement of parts shown and described without departing from the spirit and scope of my invention hence I would have it understood that I do not wish to confine myself to the exact construction shown and described, but, Having fully described my invention what I claim as new and desire to secure by Letters-Patent, is:—

1. In a center bearing, a series of segmental bearing devices arranged about a pivotal center and adapted to rock radially and circumferentially with respect to said center, and means for retaining said bearing devices in proper relation to each other.

2. In a center bearing, a series of segmental bearing devices arranged about a pivotal center and adapted to rock radially and circumferentially, means for retaining said bearing devices in proper relation to each other, and means for limiting their movement and retaining them in position with relation to the center.

3. In a center bearing, a series of segmental rockers arranged about a pivotal center and having bearing surfaces curved in a plurality of directions permitting them to rock radially and circumferentially with respect to said pivotal center, and means for retaining said rockers in proper position relatively to each other.

4. In a center bearing, a series of segmental rockers arranged to rock radially and circumferentially around a pivotal center, means for engaging the several rockers for limiting the movements of the latter toward and away from the center, and means for retaining the rockers in proper relation to each other.

5. In a center bearing, a series of segmental rockers having top and bottom bearing faces curved in a plurality of directions and arranged about a pivotal center, said bearing faces being farther apart than the side surfaces of said rockers.

6. In a center bearing, the combination of upper and lower bearing members, a series of segmental tapering rockers interposed between said members and arranged to rock radially and circumferentially about a pivotal center, and separating means between the rockers.

7. In a center bearing, the combination of upper and lower bearing surfaces, one of them having a depressed or recessed seat, a series of tapering rockers interposed between said bearing surfaces and having bearing faces curved in a plurality of directions, and separating means between the rockers.

8. In a center bearing, the combination of upper and lower bearing members, a series of tapering segmental rockers arranged to rock radially and circumferentially about a pivotal center, and interposed between the upper and lower bearing members, means attached to the lower member and engaging the rockers for preventing lateral displacement of the latter, and separating means between the rockers.

9. In a center bearing, the combination with upper and lower members, of a series of tapering segmental rockers arranged to rock radially and circumferentially about a pivotal center, means for preventing displacement of said rockers radially with relation to the pivotal center, and separating means between the rockers.

10. In a center bearing, the combination with a recessed center bearing member and a series of segmental rockers arranged to rock radially and circumferentially around the center of the bearing member, of an upper bearing member, and means carried by said upper bearing member and engaging the rockers whereby all of the latter are caused to move in unison.

11. In a center bearing a series of segmental rockers arranged to rock radially and circumferentially around a pivotal center, means engaging the several segments for limiting the movements of the latter toward and away from the center, and means disposed between said rockers for holding them separated.

12. In a center bearing, the combination with a recessed seat, a series of segmental rockers therein, fixed means for retaining the segments in position with relation to the center, and fixed means disposed between the segments for holding them apart, of an upper bearing member, and means depending from said upper bearing member and engaging the several segments whereby the latter are caused to move in unison.

13. In a bearing, the combination with a bearing member, of an annular series of tapering rockers having bearing faces curved in a plurality of directions mounted to rock on said bearing member, and separating means between the rockers.

14. In a bearing, the combination with upper and lower bearing members, of an annular series of segmental rockers disposed between said bearing members, each of said rockers having bearing faces curved in a plurality of directions engaging said upper and lower bearing members, and separating means interposed between the rockers.

In testimony whereof, I have signed this specification in the presence of two subscribing witnesses.

SAMUEL P. BUSH.

Witnesses:
 FRED G. BENNETT,
 GEO. G. MERRING.